US005504645A

United States Patent [19]

Hinrichsen et al.

[11] Patent Number: 5,504,645

[45] Date of Patent: Apr. 2, 1996

[54] ARRANGEMENT WITH SEVERAL SURGE ARRESTERS

[75] Inventors: Volker Hinrichsen; Wolfgang Kühne, both of Berlin, Germany

[73] Assignee: Siemens Aktiengesellschaft, München, Germany

[21] Appl. No.: 428,140

[22] PCT Filed: Oct. 22, 1993

[86] PCT No.: PCT/DE93/01019

§ 371 Date: May 26, 1995

§ 102(e) Date: May 26, 1995

[87] PCT Pub. No.: WO94/10730

PCT Pub. Date: May 11, 1994

[30] Foreign Application Priority Data

Oct. 30, 1992 [DE] Germany .......................... 42 37 284.4

[51] Int. Cl.[6] .......................... H02H 9/04

[52] U.S. Cl. .......................... 361/120; 361/129; 361/134

[58] Field of Search .......................... 361/56, 120, 127, 361/128, 129, 134

[56] References Cited

U.S. PATENT DOCUMENTS 4,989,115 1/1991 Bourdagen et al. .................... 361/127

FOREIGN PATENT DOCUMENTS 0914640 7/1954 Germany .

2248113C3 4/1974 Germany .

*Primary Examiner*—Todd DeBoer

*Attorney, Agent, or Firm*—Kenyon & Kenyon

[57] ABSTRACT

An arrangement is described with several surge arresters arranged next to one another with their longitudinal axes substantially parallel. Each surge arrester is coupled to a common conductor rail via connecting lines which extend substantially radially away from the longitudinal axis of the surge arrester in a direction opposite to the position of exhaust openings on the circumference of the surge arrester. In the event of an electric arc, a current flowing through the connecting line thus generates a magnetic field which pushes the electric arc away from the surge arrester. The exhaust openings on each surge arrester are positioned so that the electric arc does not occur in the area between two adjacent surge arresters and is pushed away from the surge arresters by the components of the magnetic field. In addition, the direction of flow of the current in the connecting lines forms an angle smaller than 90° with the common conductor rails, so that the current in the common conductor rails also contributes to generate the desired magnetic field.

6 Claims, 1 Drawing Sheet

ARRANGEMENT WITH SEVERAL SURGE ARRESTERS

BACKGROUND INFORMATION

The invention present concerns an arrangement with several surge arresters, arranged next to one another with parallel axes, which each have an electric arc section arranged outside and parallel to the longitudinal axis of the arrester housing, a first connecting line to join the respective surge arrester to a common first conductor rail, and a second connecting line; and in which each first connecting line is oriented, beginning from a first end of the respective surge arrester, perpendicular to the latter's axis.

An arrangement of surge arresters of this kind is known, for example, from German Patent No. 22 48 113. In the arresters of the known arrangement, in the event of an overload, an electric arc can occur in the outer region between the connecting lines of the surge arrester. The aforesaid German patent discloses no means which promote the removal of such an electric arc from the arrester housing, or prevent the occurrence of an electric arc between two adjacent surge arresters, although an electric arc specifically at this point can damage several surge arresters.

SUMMARY OF THE INVENTION

It is the object of the invention to configure an arrangement of several surge arresters of the aforesaid type in such a way that, on the one hand, electric arcs do not occur in the region between several arresters, and on the other hand, arcs that do occur are removed as quickly and reliably as possible from the arrester housing.

According to the present invention, the aforementioned object is attained by the fact that the position of the electric arc section at the circumference of the respective surge arrester is defined by at least one exhaust opening which is arranged at the circumference of the surge arrester at a position facing away from the adjacent surge arresters; that a first connecting line extends from the respective surge arrester substantially radially in the direction facing away from the electric arc section; and that the direction of flow of the current in the respective first connecting line on the one hand and in the first conductor rail on the other hand from in each of the surge arresters an angle that is less than 90 degrees.

The individual surge arresters have exhaust openings that, in the event of an overload, allow hot insulating gas to flow from the interior of the arrester housing along its outer wall. In the event of an overload, an electric arc is to occur preferentially in this region. According to the present invention, the arrangement is such that no electric arc sections are provided in the region between adjacent surge arresters, since an electric arc between two arresters would place a heavy thermal load on both of them. For example, if the surge arresters are arranged vertically in a row next to one another, the electric arc sections can in each case be arranged on one long side of the row at each surge arrester.

Because the connecting line is arranged perpendicular to the longitudinal axis of the respective surge arrester, and thus also perpendicular to the electric arc section, the magnetic field generated by a current flowing through the first connecting line is oriented in such a way that it exerts upon the electric arc a force which moves it. Since, according to the invention, the first connecting line extends, for each of the surge arresters, radially in the direction facing away from the electric arc section, the result is a magnetic field, generated by a current in the first connecting line, which pushes the electric arc away from the housing of the respective arrester. Because an angle of less than 90 degrees is formed between the direction of flow of the current in the respective first connecting line and the direction of flow of the current in the first conductor rail, the current within the first conductor rail also makes a contribution to the creation of a magnetic field that pushes the electric arc away from the arrester housing.

If the first conductor rail were arranged perpendicular to the respective first connecting line, the current flowing through the first conductor rail would not result in a magnetic field component that would exert the desired effect on the respective electric arc. The smaller the angle between the directions of flow of the current in the first conductor rail and in the respective first connecting line, the greater the contribution of the conductor rail to the desired magnetic field component and the resulting desired force component on the electric arc.

In a particularly advantageous embodiment of the present invention, the angle between the directions of flow of the current in the first conductor rail and in the respective first connecting line is in a range between 25 and 65 degrees.

The smallest possible angle would be desirable in order to increase the contribution of the first conductor rail to the desired force component. However, this conflicts with the desire for the most compact possible arrangement of several surge arresters that must all be connected to the first conductor rail. A good compromise between compact arrangement and sufficient contribution upon generation of the magnetic field by the first conductor rail is attained in the aforesaid advantageous range of angles.

A further advantageous embodiment of the present invention provides for the two connecting lines of each surge arrester to constitute the arms of a U, the base of which is constituted by the longitudinal axis of the surge arrester.

The result of this configuration of the first and second connecting line of each surge arrester is that the two connecting lines contribute in the same direction to the generation of a magnetic field that pushes the electric arc away from the outer wall of the arrester.

In addition, the present invention can be advantageously embodied by the fact that the angle is the same for a first group of surge arresters.

The surge arresters of this first group can then be arranged close to one another, and the connecting lines of the respective surge arresters can be aligned parallel to one another and be connected to a conductor rail running next to the surge arrester.

A further advantageous embodiment of the present invention provides for each surge arrester to be joined, by means of its second connecting line, to a common second conductor rail; and for the conductor rails to be arranged parallel to one another.

In this case a contribution is made to the creation of the desired magnetic field by both the first and the second conductor rail.

In addition, the present invention can advantageously be configured with a second group of surge arresters and corresponding first connecting lines in that the angle enclosed between the direction of flow of the current in the respective first connecting line, on the one hand, and the direction of flow of the current in the first conductor rail, on the other hand, is the same for all surge arresters of a second group; and that the first and second groups of surge arresters and the corresponding first connecting lines are arranged on different sides of the first conductor rail in mirror symmetry to one another with reference to a plane containing the longitudinal axis of the first conductor rail.

With this design, two groups of surge arresters are arranged in such a way that all the surge arresters are arranged, compactly and parallel to one another, in such a way that the magnetic fields occurring in the event of an overload push the respective electric arcs away from the arrester housing without endangering adjacent surge arresters.

BRIEF DESCRIPTION OF THE DRAWINGS

FIG. 1 shows a first surge arrester 1 which has a substantially cylindrical shape. In each of its end regions, surge arrester 1 has an exhaust opening 2, 3 that defines, at the circumference of surge arrester 1, the position of an electric arc in the event of a load on the arrester. This is because when hot insulating gases are exhausted through exhaust openings 2, 3, hot, ionized air emerges there, promoting the striking of an electric arc in this region.

The first surge arrester 1 is joined via a first connecting line 4 to a first conductor rail 5. Connecting line 4 and conductor rail 5 form an angle 21 that is less than 90 degrees.

Figure 1:
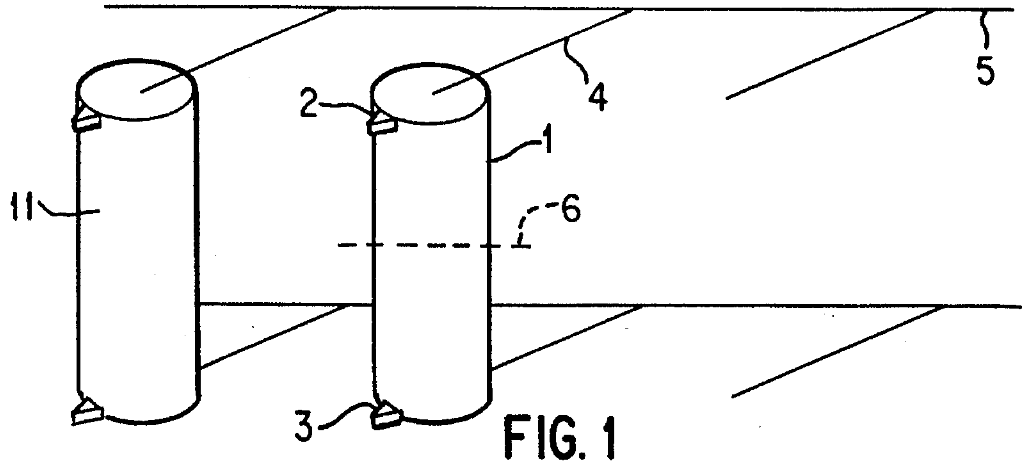
FIG. 1 shows a perspective view of two adjacent surge arresters in accordance with the present invention.
Figure 2:
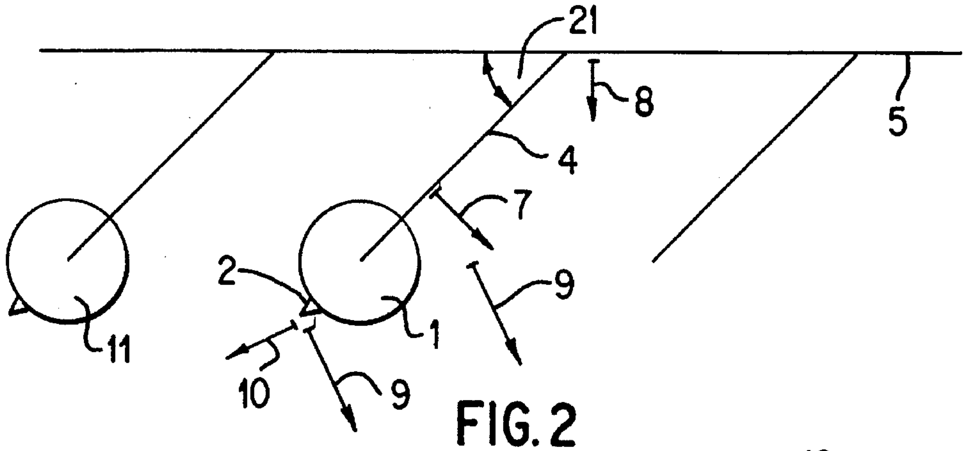
FIG. 2 shows a plan view of the surge arresters of FIG. 1.

In the event that an electric arc is struck on the outside of the first surge arrester 1, the current flowing to this surge arrester 1 via the first connecting line 4 generates in the region of center plane 6 of the surge arrester a magnetic field that has the direction indicated by an arrow 7. At the same time, the current flowing in the first conductor rail 5 causes a magnetic field whose direction in the vicinity of center plane 6 of the surge arrester is shown by an arrow 8. In the vicinity of surge arrester 1, these two magnetic fields 1 add together to form a resulting magnetic field whose direction is indicated by an arrow 9. The consequence of this field 9 is that a force in the direction of arrow 10 is exerted on the electric arc. The electric arc is thus moved away from surge arrester 1, in a direction such that adjacent surge arrester 11 is also not damaged or thermally stressed. Surge arrester 11 has, with its exhaust opening and connecting lines and input line, a geometry just like that of the first surge arrester, as do all the other surge arresters arranged in a row next to one another, although only two of them are depicted in FIGS. 1 and 2.

Because angle 21 is less than 90 degrees, the magnetic field indicated by arrow 8 and generated by the current in conductor rail 5 yields a partial component oriented perpendicular to connecting line 4, which sums additively with magnetic field 7 generated by the current in connecting line 4 to produce a total magnetic field 9. The result is to exert on the electric arc the force indicated by arrow 10.

The present invention ensures on the one hand that an electric arc struck On the surge arrester is pushed away from it in such a way that the adjacent surge arresters are also not damaged and on the other hand that an electric arc is pushed away from a row of surge arresters not perpendicularly, but at an angle which deviates from the perpendicular. This reduces the minimum spacing that must be maintained between a group of surge arresters and an adjacent component so as not to expose the adjacent component to the effect of electric arcs.

Figure 3:
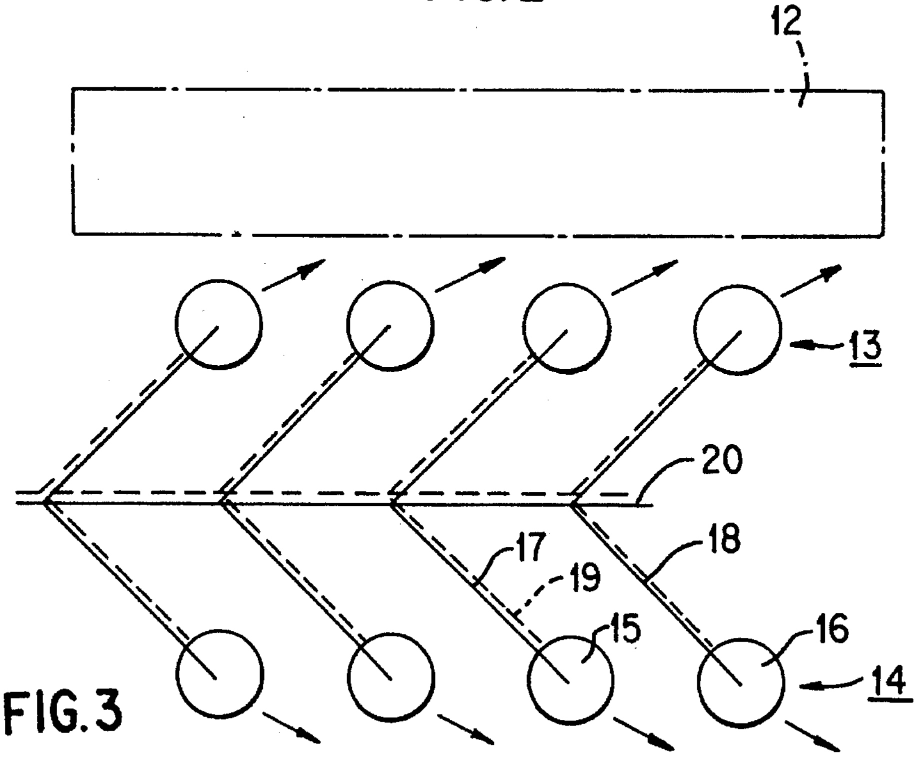
FIG. 3 shows a schematic plan view of an arrangement of two groups of surge arresters in accordance with the present invention.

FIG. 3 schematically depicts a capacitor bank 12 that is arranged in the immediate vicinity of a group of surge arresters, but that, because the electric arcs are bloom out obliquely, is not thermally stressed in the event of an overload.

FIG. 3 shows an arrangement with two groups 13 and 14 of surge arresters 15, 16, connecting lines 17, 18 of which run parallel within each group, such that in each case the first 17 and second connecting lines 19 of an individual surge arrester also run parallel to one another and congruently. The second connecting line 19 of each surge arrester 15, 16 is drawn as a dashed line in a position offset from its actual location, in order to make each one apparent in addition to the first input line of the same surge arrester. The first group 13 of surge arresters lies on the first side of a conductor rail 20, while the second group 14 of surge arresters lies symmetrically opposite the first group 13 with respect to conductor rail 20. The second conductor rail is labeled 22 in FIG. 3.

The connecting lines of all the surge arresters together form a herringbone pattern. This results in a compact arrangement of all the surge arresters, and a force on the electric arcs of defined direction, due to the magnetic effect of the currents being dissipated. With this design, electric arcs that occur are reliably pushed away from the arrester housing with no risk that a surge arrester will be destroyed by thermal overload, and with no danger to adjacent system elements.

What is claimed is:

1. A surge arrester arrangement comprising:

a plurality of surge arresters arranged next to one another with longitudinal axes in parallel, each surge arrester having a housing and an electric arc section arranged outside and parallel to the longitudinal axis of the arrester housing;

a plurality of first connecting lines, with each first connecting line coupled to each surge arrestor at a first end of the surge arrester; and a first common conductor rail, wherein:

each first connecting line couples each respective surge arrestor to the first common conductor rail;

each first connecting line is oriented perpendicular to the longitudinal axis of the respective surge arrester;

the position of the electric arc section of each respective surge arrester is defined by at least one exhaust opening arranged on the housing of the surge arrester at a position facing away from an adjacent surge arrester;

the first connecting line extends from the respective surge arrester substantially radially in a direction facing away from the electric arc section; and an angle between a direction of current flow in each first connecting line and in the first common conductor rail is less than 90 degrees.

2. The arrangement according to claim 1, wherein the angle is between 25 degrees and 65 degrees.

3. The arrangement according to claim 1, wherein:

a second connecting line of each surge arrester runs parallel to the respective first connecting line; and the first and second connecting lines and the longitudinal axis of each surge arrester form a U-shaped configuration.

4. The arrangement according to claim 1, wherein the angle is the same for all surge arresters in a first group of surge arresters.

5. The arrangement according to claim 1, wherein:

each surge arrester is coupled, by a respective second connecting line, to a second common conductor rail; and the first and second common conductor rails are arranged parallel to one another.

6. The arrangement according to claim 4, wherein:

the angle is the same for all surge arresters in a second group of surge arresters; and the first and second groups of surge arresters and their corresponding first connecting lines are arranged on different sides of the first conductor rail in mirror symmetry to one another with reference to a plane containing the first conductor rail.

* * * * *